United States Patent
Scardo et al.

(10) Patent No.: US 7,076,480 B2
(45) Date of Patent: Jul. 11, 2006

(54) DYNAMIC ADJUSTMENT OF COMMIT FREQUENCY

(75) Inventors: William E. Scardo, Richmond, VA (US); Gary L. Blair, Asheville, NC (US)

(73) Assignee: Softbase Systems, Inc., Asheville, NC (US)

( * ) Notice: Subject to any disclaimer, the term of this patent is extended or adjusted under 35 U.S.C. 154(b) by 339 days.

(21) Appl. No.: 10/186,442

(22) Filed: Jul. 1, 2002

(65) Prior Publication Data

US 2004/0002975 A1    Jan. 1, 2004

(51) Int. Cl.
G06F 17/30 (2006.01)
G06F 7/00 (2006.01)

(52) U.S. Cl. .............................. 707/3; 707/8
(58) Field of Classification Search ................. 707/10, 707/2, 3, 8; 714/39
See application file for complete search history.

(56) References Cited

U.S. PATENT DOCUMENTS

| 5,319,773 | A |   | 6/1994  | Britton et al. |
| 5,369,764 | A |   | 11/1994 | Blair |
| 5,940,827 | A | * | 8/1999  | Hapner et al. .................. 707/8 |
| 5,950,212 | A | * | 9/1999  | Anderson et al. ........... 707/205 |
| 6,286,004 | B1 | * | 9/2001 | Yoshiura et al. .............. 707/10 |
| 6,751,753 | B1 | * | 6/2004 | Nguyen et al. ................ 714/39 |

FOREIGN PATENT DOCUMENTS

EP    1 394 700 A2    3/2004

OTHER PUBLICATIONS

European Search Report mailed Jun. 22, 2004 and prepared May 12, 2004 in corresponding European Application No. EP 03251302 (published as No. EP 1 394 700 A2 on Mar. 3, 2004), European Patent Office—Berlin, (2 pages plus cover).

Adams S.: "Oracle Advanced Performance Tuning Script—Redo Log Scripts" Internet Publication, Online! May 15, 2002, XP002278874 Retrieved from the Internet: <URL:http://www.ixora.com.au/scripts/redo_log.htm#commit_every > re-retrieved on Jul. 15, 2004.

International Technical Support Organization: "DB2 for OS/390 Application Design Guidelines for High Performance" Internet Publication, Online! Aug. 1997, XP002278875 Retrieved from the Internet: <URL:http://www.frc.utn.edu.ar/campus/ibm/pdfs/sg242233.pdf> re-retrieved on Jul. 15, 2004 section "5.7.4 Commit Frequency".

(Continued)

Primary Examiner—Don Wong
Assistant Examiner—Thanh-Ha Dang
(74) Attorney, Agent, or Firm—Carter Schnedler & Monteith, P.A.

(57) ABSTRACT

An interface between a relational database application program and a database management system that reduces application program execution time by reducing the number of commit operations performed by the commit facility of the database management system. Repeatedly, commit statements issued by the application program are suppressed until a time interval based on a time interval parameter has elapsed, and then the next commit statement issued by the application program is passed on to the database management system.

36 Claims, 8 Drawing Sheets

OTHER PUBLICATIONS

Dunn S: "Commit Frequency" Internet Publication, Online! Apr. 14, 1995, XP002278876 Retrieved from the Internet: <URL: http://groups.google.de/groups?q=commit+frequency+elapsed&hl=de&lr=&ie=UTF-8&selm=797898111snz%40lilydale.demon.co.uk&mum=1> re-retrieved on Jul. 15, 2004.

Adams S: "How to speed up an update" Internet Publication, Online! Apr. 5, 2001, XP002278877 Retrieved from the Internet: <URL:http://www.ixora.com.au/q+a/0104/05144430.htm>re-retrieved on May 3, 2004! *the whole document*.

Baker B: "The Woes of Commitment" Internet Publication-DB2 Magazine, Online! 1998, XP002278878 Retrieved from the Internet: <URL:http://www.db2mag.com/db_area/archives/1998/q3/98fprog.shtml> re-retrieved on Jul. 15, 2004 section "Too Many Commits" section "and this is just Right".

* cited by examiner

DYNAMIC ADJUSTMENT OF COMMIT FREQUENCY

BACKGROUND OF THE INVENTION

The invention relates generally to computer databases and, more particularly, to an interface between a relational database application program and a database management system which includes locking and commit facilities.

Databases are computerized information storage and retrieval systems. A database manager, also known as a database management system (DBMS) or a relational database management system (RDBMS), is a complex and sophisticated computer program that provides a variety of tools for defining, manipulating data in, controlling access to and otherwise managing the database in a variety of ways. The database management system stores and retrieves data as database records organized into tables which consist (conceptually) of rows and columns of data. Conventionally, database records are accessed a row at a time.

It is quite possible for a database management system to access database records in response to commands typed one at a time by individual on-line users accessing the database from terminals, which typically are remotely distributed. However, embodiments of the invention are concerned with batch mode execution of database application programs that include programming statements (program code) written in a language such as SQL (Structured Query Language). As a matter of convenience, such program statements are sometimes referred to hereinbelow and in the accompanying drawings as SQL statements, and include statements to create, modify and delete database records in accordance with the intended purpose of the application program.

A significant characteristic of computer operating systems and database management systems with which the invention is concerned is that they are multitasking. Thus, more than one on-line user and/or more than one batch-mode application program can interact with the database through the database management system at the same time.

A particular relational database management system in combination with which the invention may be employed is known as DB2, a product of International Business Machines Corporation (IBM). DB2 runs on mainframe computers under operating systems such as OS/390. Versions are also available for various personal computer operating systems. The invention, however, is not in any way limited to use in combination with DB2, and may, for example, be employed in combination with other relational database management systems such as Oracle, Sybase, Informix and SQL Server.

Historically, an IBM software product named Time Sharing Option (TSO) was employed as part of a computer operating system to enable batch mode database application programs to access the records of a database managed by DB2. DB2 itself had no batch mode interface.

In view of various limitations associated with TSO, other approaches have been developed to run DB2 database application programs in batch mode, such as the approach in a product known as Database Attach™, marketed by Softbase Systems, Inc., of Asheville, N.C. (url http://www.softbase.com) The Database Attach™ product is an interface between application programs and the Call Attachment Facility of the DB2 database management program, which interface does not require the TSO environment. Database Attach™ handles execution of SQL statements, passing them on to the DB2 Call Attachment Facility. An ENQ feature of Database Attach™ that virtually eliminates deadlock/timeout conditions between competing batch-mode applications is disclosed in Blair U.S. Pat. No. 5,369,764.

An essential capability of a practical, multi-user database management system, such as DB2, is to control concurrency. Thus, in an environment where more than one application process or user is accessing the same database, there is always a danger that the actions of one application process or user can interfere with those of another, unless suitable controls are in effect. Preventing essentially simultaneous transactions from interfering with each other, in other words, controlling concurrency, means making sure that data is not seen or operated on by another user or batch application program, until a pending change is complete. Accordingly, relational database management systems include a locking facility which "locks" database records with pending changes on behalf of one user or process to prevent access by another user or process.

A classic example involves the sale of seats on an airplane. Two potential customers, at different locations, may be accessing (either directly or through an agent) a database which indicates that a particular seat is available. If both customers then decide to purchase a ticket for the seat, the possibility exists that an update to the database on behalf of the first customer indicating that the seat has been sold to the first customer may be overwritten by an update to the database on behalf of the second customer indicating that the seat has been sold to the second customer. More specifically, in this situation (which should not be allowed to occur in a practical system) the second customer has been allowed to update the database on the basis of information that is no longer current, instead of being forced to see the most current information.

As another example, a banking transaction might involve the transfer of funds from one account to another. Such a transaction would require that the funds be subtracted from the first account, then added to the second. Following the subtraction step, the data is inconsistent. Only after the funds have been added to the second account is consistency reestablished. Only when both steps are complete, should the records involved in the transaction be accessible to other application processes.

There are of course many variations of situations where such undesirable results can occur when database records are updated, unless some form of concurrency control is implemented, such as locking.

Thus, database application programs (comprising SQL statements) are organized to effect units of work, which may also be termed transactions. Transaction management means ensuring that a set of SQL statements is treated as a unit; transaction management guarantees either that all of the SQL statements within a unit of work are completed, or that none is completed. At the beginning of execution of a sequence of program statements that define a unit of work, the locking facility locks database records with pending changes to prevent access by any other program or user. Each logical unit of work ends with a commit statement, and the database management system includes a corresponding commit facility which effects a commit operation to commit pending database changes, and release locks. (Alternatively, a rollback operation may be performed prior to commit, thus backing out of pending database changes.) Once committed, database changes are accessible by other application programs and users, and can no longer be backed out by a rollback. A unit of work may also be described as a recoverable sequence of program statements executed by the database management system for an application program. (A broader term, which encompasses other recoverable resources used by the application program, in addition to relational databases, is a unit of recovery. In the context of the invention, units of work and unit of recovery have the same meaning.) In the banking transaction example above, a unit of work begins (and locks are established) when SQL statements to effect the transaction begin to access the account records. The unit of work ends when both steps are complete, and a commit statement is executed. At any time, an application process has a single unit of work, but the life of an application process can involve many units of work as a result of commit or rollback operations.

To avoid unduly causing contention with (i.e. locking out) other users and application processes, a properly written database application program is organized as a plurality of logical units of work, each ending with a commit statement.

Correspondingly, if another application program or user attempts to access a database record which has been locked, that other database application program or user is required to wait until the first application program or user has finished its unit of work or transaction, and has allowed the locks to be released.

Many applications are designed to commit at frequent intervals during execution. An example is a batch application designed to perform updates to database tables that are shared by an online application and where it is desired to reduce online contention.

A drawback of locking, particularly where an application program is designed to commit at frequent intervals during execution, relates to the efficient use of computer resources. Significant processing overhead is associated with a commit operation, which accordingly is relatively time consuming. For example, when a commit operation is performed, data which has been held in relatively fast random access memory (RAM) is externalized by being written to disc, a much slower operation than accessing random access memory. An application program could be issuing commit statements hundreds or even thousands of times per second, requiring the database management system to spend a relatively large percentage of its time performing commit operations.

Thus, there are times when it is desirable to reduce the frequency at which commit operations are performed on behalf of an application program, thereby reducing the amount of time required for the application to execute.

Referring again to an example above, a batch application may have been designed to perform updates to database records that are shared by on-line applications. The batch application program, in an attempt to reduce contention, would be programmed so as to commit frequently. However, there may be times when the batch application is executed during which contention is not a major concern.

In prior versions of the Database Attach™ product, a "variable commit frequency" feature is implemented, which accepts a COMMITFREQ parameter. The COMMITFREQ parameter acts as a frequency divider value by which the frequency at which commit statements are issued during program execution is divided to determine a reduced frequency at which commit operations are actually performed by the commit facility. As an example, a COMMITFREQ parameter value of ten might be employed. Accordingly only every tenth commit statement issued by the application program is passed on to the database management system, and the other nine are suppressed. As a result, application program execution is speeded up (but at the expense of potential increased contention as viewed by other application processes or users).

SUMMARY OF THE INVENTION

In embodiments of the invention, an interface between a relational database application program and a database management system reduces application program execution time by reducing the number of commit operations performed by the commit facility. Repeatedly, commit statements issued by the application program are suppressed until a time interval based on a time interval parameter has elapsed, and then the next commit statement issued by the application program is passed on to the database management system.

DETAILED DESCRIPTION

Figure 1:
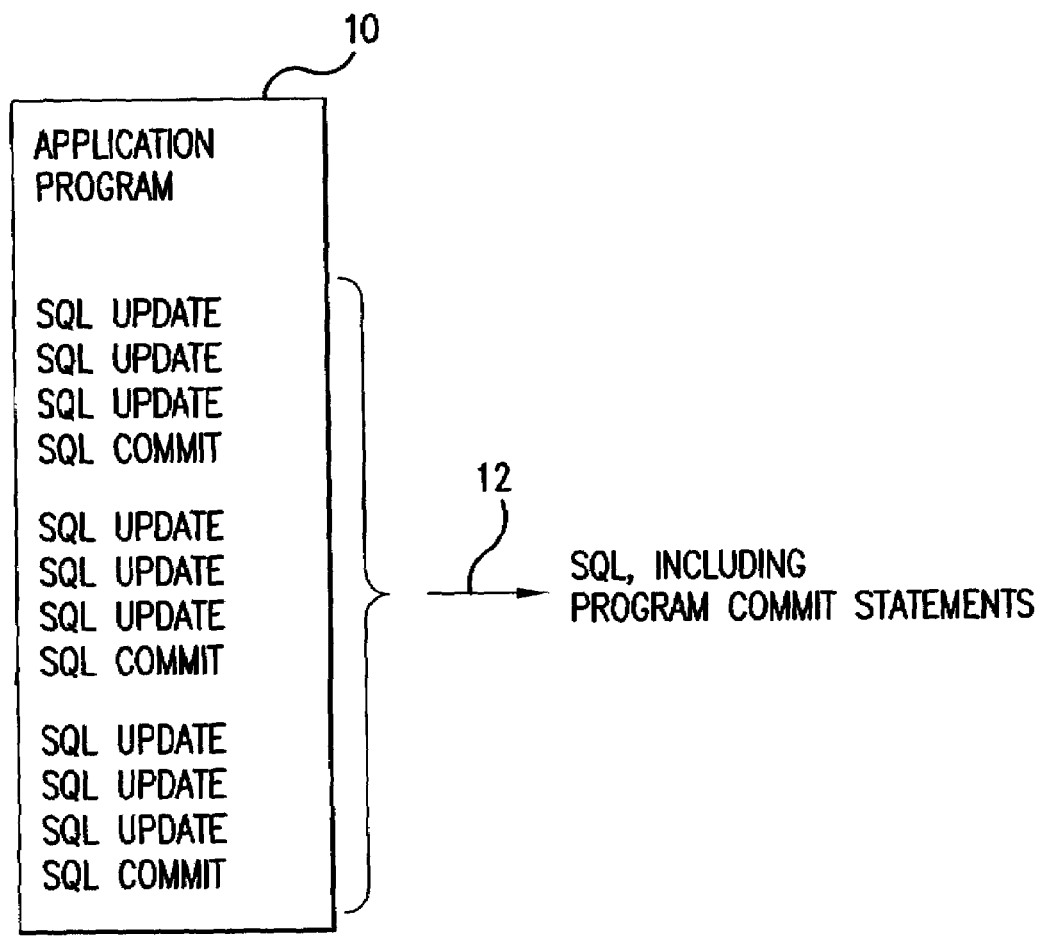
FIG. 1 represents an application program.

Referring first to FIG. 1, represented is an application program 10, written, as an example, in the relational database programming language known SQL (Structured Query Language). In the simplified representation of FIG. 1, SQL statements are of two types, SQL update statements and SQL commit statements. The SQL update statements represent any SQL statements which change a database, such as by modifying, creating or deleting database records. Thus, the update statements shown in FIG. 1 update values of records in a database. By way of example and not limitation, other SQL statements which make changes to a database are insert statements, which insert rows into a table, and delete statements which delete rows from a table.

The example application program 10 of FIG. 1 includes three units of work, each beginning with an SQL update statement, having two additional SQL update statements, and ending with an SQL commit statement. An arrow 12 in FIG. 1 represents the SQL statements, including program commit statements, being passed on one at a time to an execution environment in a conventional manner. Within each unit of work in the example of FIG. 1, the three SQL update statements define a recoverable sequence of program statements which are not made permanent until the commit statement is executed by the database management system. In other words, database changes are pending. As discussed hereinabove, the database management system locks the database records accessed by the SQL update statements within each unit of work, and releases the locks when the commit statement is executed by the database management system. It may be that a rollback occurs, backing out of the pending updates, prior to the pending database changes being committed.

Figure 2:
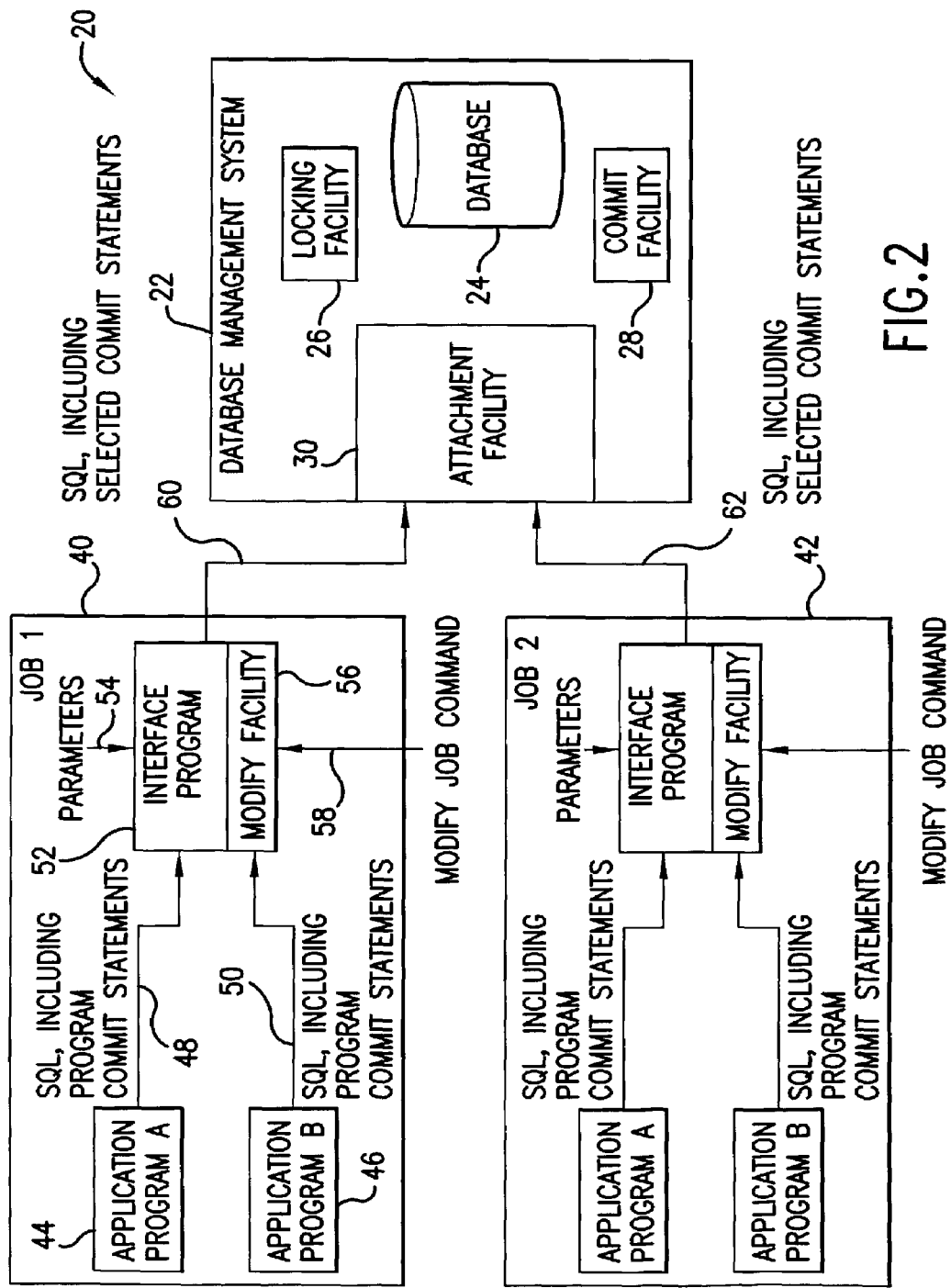
FIG. 2 is a block diagram of a computer system embodying the invention, including the application program of FIG. 1.

FIG. 2 represents an overall computer system and execution environment 20, which may be distributed, and which includes conventional elements such as memory for storing program instructions and data, as well CPUs. Included is a database management system 22, which may take the form of a database manager such as DB2. The database management system 22 manages a relational database 24 including, in conventional manner, a plurality of tables storing data organized as rows and columns.

The database management system 22 includes a locking facility 26 which locks records in the database 24 with pending changes by one program to prevent access by any other program or user. The database management system 22 additionally includes a commit facility 28 which executes commit statements by committing pending database changes, and releasing locks established by the locking facility 26.

The database management system 22 additionally includes a facility 30 by which application programs can connect to the database management system 22. In the representative example of DB2, the facility 30 used for connecting is the Call Attachment Facility 30. It will be appreciated that other terminology and details will be involved when connecting to or interfacing with other database management systems.

The database management system 22 comprises software that runs on a server. Permanent records of the database 24 are stored on non-volatile media such as one or more disc drives. As a practical matter, in the interests of execution speed, selected database records, particularly those with pending changes, are stored in RAM. Thus, one of the effects of a commit operation is the writing of database records from RAM to disc, sometimes referred to as externalizing the data.

Also represented in FIG. 2 are two jobs 40 and 42 (JOB 1 and JOB 2) that are connected to the database management system 22, and are accessing the database 24. The two jobs 40 and 42 are representative of many potential jobs that may be connected to the database management system 22. Alternatively, a single job may be connected. In the representation of FIG. 2, the two jobs 40 and 42 (JOB 1 and JOB 2) have identical representations. Accordingly, the description below generally refers only to job 40 (JOB 1). The two jobs 40 and 42 (JOB 1 and JOB 2) typically are running on different client computers.

Within job 40 (JOB 1) two application programs 44 and 46 are represented, labeled "Application Program A" and "Application Program B," respectively. Each of the application programs 44 and 46 takes the form of the FIG. 1 application program 10. During execution, the application programs 44 and 46 (Application Program A and Application Program B) issue program statements, including program commit statements, as represented by lines 48 and 50 labeled "SQL, Including Program Commit Statements."

Functioning as an interface between the application programs 44 and 46 and the database management system 22, in particular, the Call Attachment Facility 30 of the database management system 22, is an interface program 52. The interface program 52 may comprise the product known as Database Attach™, available from Softbase Systems, Inc., of Asheville, N.C., aspects of which are disclosed in Blair U.S. Pat. No. 5,369,764. The Database Attach™ product is periodically revised or upgraded as features, for example embodying the invention, are added. The interface program 52 in general handles execution of all program SQL statements, passing SQL statements on to the database management system 22 via the Call Attachment Facility 30.

The overall purpose of the Database Attach™ product which may be employed as the interface program 52 in FIG. 2 is to allow batch programs that access DB2 to execute natively, rather than under batch TSO. The Database Attach™ product can also include additional capabilities, such as an SQL monitoring facility, which is a facility for recording performance information about the execution of SQL statements from a batch application program.

The interface program 52 accepts a number of parameters via a parameter input 54. In the specific example of the Database Attach™ product for accessing DB2, the parameters are retrieved from the DBAIN DD file. This is an eighty-byte record length file, and may be disc or in-stream input. In embodiments of the invention, valid parameters accepted via the parameter input 54 (i.e. retrieved from the DBAIN DD file) include the keywords ALLOWMODIFY, COMMITFREQ and TIME.

The interface program 52 is written so as to incorporate a modify facility 56 via which modify job commands may be accepted from a system operator during execution, as indicated by arrow 58. The Database Attach™ product, when ALLOWMODIFY (YES) is coded in the DBAIN input stream, allows the Operator Modify Command to be used to modify the commit frequency while an application is executing. FREQ and TIME inputs are accepted in this manner, corresponding respectively to the COMMITFREQ and TIME parameters which may be input via the parameter input 54. Operator Modify Commands while an application program is executing override the corresponding parameter input via the parameter input 54.

As indicated by arrow 60, the interface program 52 executing within job 40 (JOB 1) passes on to the database management system 22 via the Call Attachment Facility SQL statements from the application programs 44 and 46 (Application Program A and Application Program B), including selected commit statements. Likewise, as indicated by arrow 62, SQL statements from application programs executing with job 42 (JOB 2), including selected commit statements, are passed on to the database management system 22 via the Call Attachment Facility 30.

The COMMITFREQ parameter may be employed to establish a commit frequency divider value n by which the frequency at which commit statements are issued by an application program, such as the application program 44 (Application Program A) is divided to determine a reduced frequency at which commit statements are passed as indicated by arrow 60 to the database management system 44, and thus to determine the frequency at which commit operations are actually performed by the commit facility 28. As an example, if COMMITFREQ (25) is coded as a parameter on the parameter input 54 (e.g. the DBAIN DD file), then the interface program 52 allows a commit operation to be performed only every twenty-fifth time the application program 44 issues a commit statement. However, when employing the COMMITFREQ parameter (despite the implication of its name) there is no particular way to specify reliably how frequently commit operations are to occur in terms of commits per second.

Thus, for example, a database application program 10 or 44 may be running as a batch process at a time when the database management system 22 is lightly loaded, in other words, there are few other application processes contending for the same resources. Under such conditions, a commit frequency divider value n of 100 may be appropriate, meaning 99 commit statements issued by the application programs are suppressed (thus causing record locks to be maintained) for every one that is passed on to the database management system 22 (allowing locks to be released). However, under other conditions in a multitasking environment, when many other application programs or processes may be contending for the same resources, and the application program is accordingly executing much more slowly, a commit frequency divider value n of 100 may not be appropriate. The actual elapsed time during which 99 commit statements are suppressed becomes excessive. A commit frequency divider value n of 10, for example, would be more appropriate under conditions at that time.

In embodiments of the invention, the interface program 52 additionally accepts a time interval parameter, which is the TIME parameter referred to hereinabove accepted via the parameter input 54 (e.g. from the DBAIN DD file). In addition, the TIME parameter may be input as an Operator Modify Command via the modify facility 56 while an application program is executing. In specific embodiments disclosed herein, the time interval parameter specifies (e.g. in units of 100ths of a second) a desired time interval between the actual execution of commit operations by the commit facility 28 of the database management system 22. The reciprocal of this time interval is an actual frequency (e.g. expressed in units of commit operations per second).

Thus, during program execution, and in a repeated operation, commit statements issued by the application program 10 or 44 are suppressed until a time interval based on the time interval parameter has elapsed, and then the next commit statement issued by the application program 10 or 44 is passed on to the database management system 22. These operations are effected by what may be termed a selection component of the computer system 20.

More particularly, in one embodiment of the invention, commit statements issued by the application program 10 or 44 are intercepted. As each commit statement is intercepted, it is determined whether the time interval has elapsed. The intercepted commit statement is passed on to the database management system 22 only if the time interval has elapsed. A timer may be employed for this purpose. Thus as each commit statement is intercepted, the timer is queried to determine whether a set time interval has elapsed. If the set time interval has elapsed, the intercepted commit statement is passed on to the database management system 22, and the timer is restarted.

In a modification, in addition to the time interval parameter (e.g. TIME) the COMMITFREQ parameter may be employed. More particularly, based on a frequency parameter (e.g. COMMITFREQ) a commit frequency divider value, herein referred to as a variable n, is determined. The frequency divider value n is a number by which the frequency at which commit statements are issued during program execution is divided to determine a reduced frequency at which commit operations are actually performed by the commit facility, as a minimum frequency. Commit statements issued by the application program 10 or 44 are intercepted. Either the next commit statement issued by the application program 10 or 44 after the time interval as described above has elapsed, or the nth commit statement issued by the application program 10 or 44 since the last commit statement has been passed on to the database management system 22, whichever occurs first, is passed on to the database management system 22. All other commit statements issued by the application program 10 or 44 are suppressed.

More particularly, in this particular modified embodiment, in addition to the timer, a counter is initialized and employed to count commit statements issued by the application program 10 or 44. Commit statements issued by the application program 10 or 44 are suppressed until n commit statements have been counted. The nth commit statement issued by the application program 10 or 44 is then passed on to the database management system 22, and the counter is re-initialized.

The operations summarized just above may be implemented as described hereinbelow with reference to the representative flow charts of FIGS. 3 and 4, which are exemplary only, and which represent an embodiment of the selection component. The operations represented in the flow charts of FIGS. 3 and 4 are part of the interface program 52.

Figure 3:
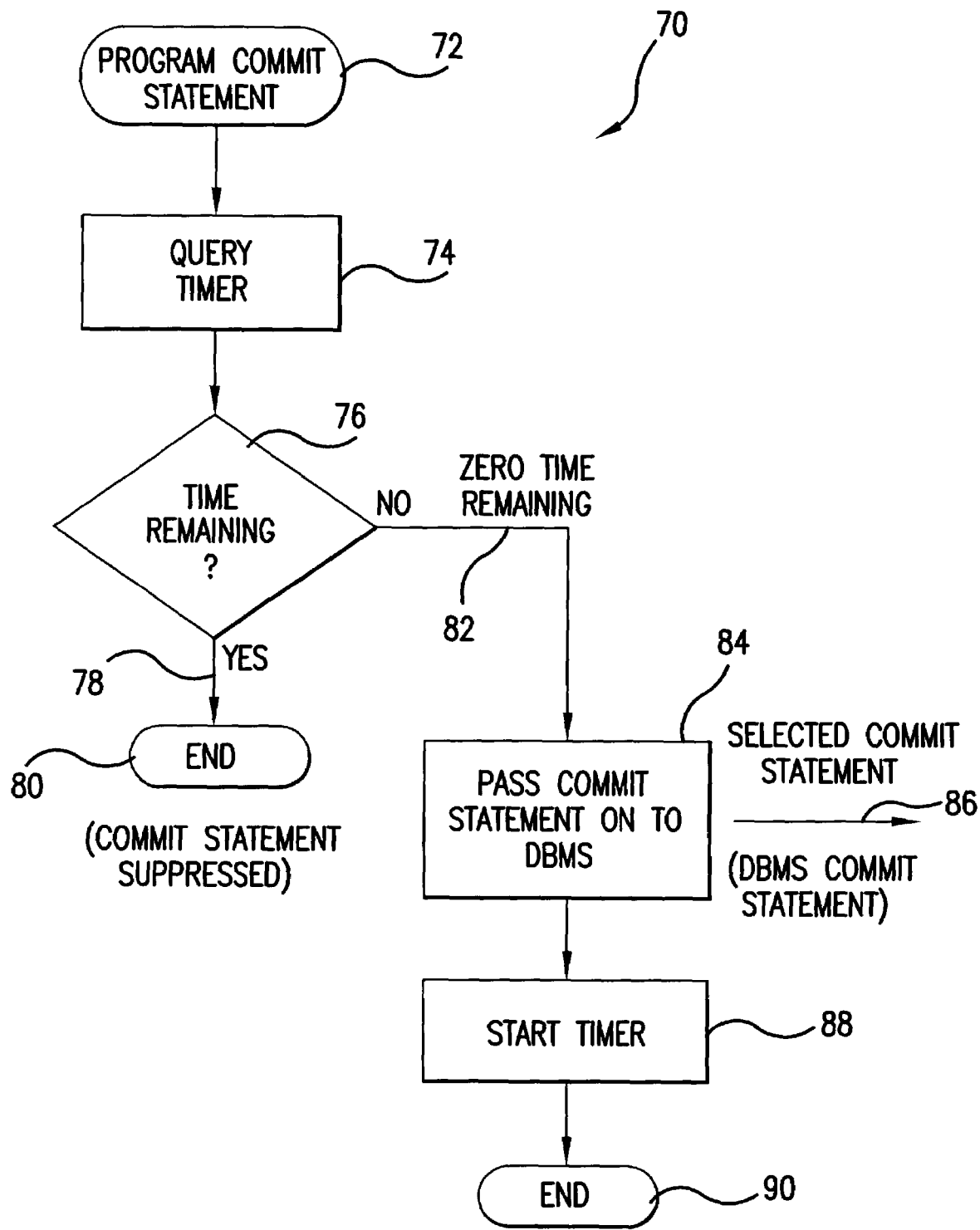
FIG. 3 is a program flowchart representing steps during the execution of an interface program included in the computer system of FIG. 2 in one embodiment of the invention when an application program issues a commit statement.
Figure 4:
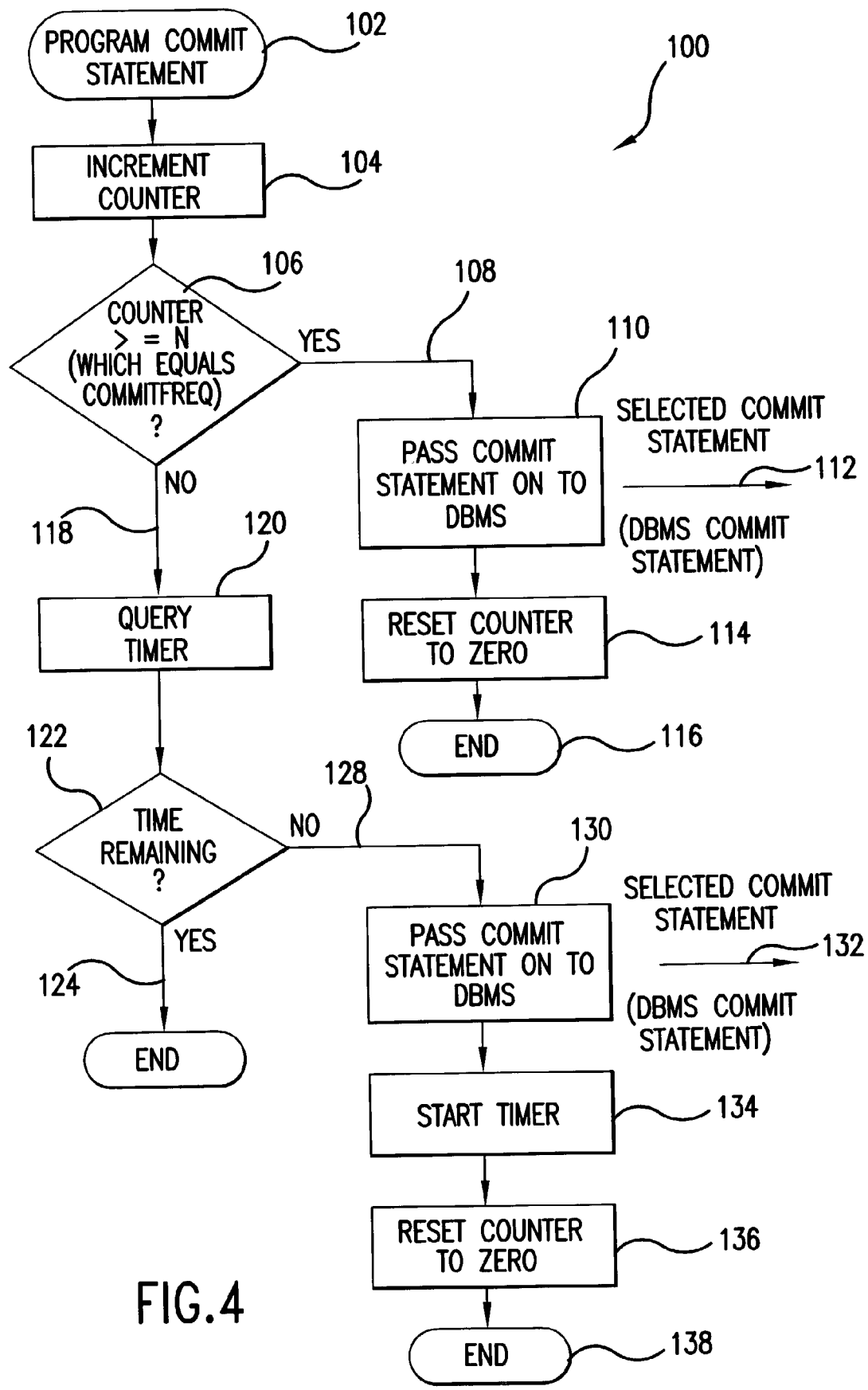
FIG. 4 is a program flowchart representing steps during the execution of an interface program included in the computer system of FIG. 2 in a modified embodiment of the invention when an application program issues a commit statement.

FIG. 3 is a flowchart 70 representing a routine executed each time an application program, such as the application program 44 (Application Program A) issues a commit statement. Accordingly, the FIG. 3 routine represents the intercepting of a commit statement, and subsequent actions taken. Although other timer facilities may be employed, including user-provided facilities, in an exemplary embodiment the FIG. 3 routine employs a count down timer facility that is part of the MVS (Multiple Virtual Storage) component of the IBM OS/390 operating system. Use of this count down timer facility requires far less execution time than retrieving system clock time, converting, and comparing to a previously-saved time would. Two programming statements are involved, STIMER and TTIMER. An STIMER statement specifies a time duration or interval and starts the count down timer counting down to zero. At any time, the TTIMER statement retrieves the time remaining. At any time after the timer has counted down to zero, meaning the set time has elapsed, the TTIMER command returns a time remaining of zero.

A PROGRAM COMMIT STATEMENT entry point is referenced 72. In box 74 the count down timer is queried. In an exemplary embodiment, this query employs a TTIMER statement. In decision box 76 it is determined whether any time remains. If the answer is "yes," then branch 78 is taken and the routine exits at 80. The particular commit statement issued by the application program 10 or 44 is not passed on to the database management system 22. In other words, the particular program commit statement is suppressed.

If, on the other hand, it is determined in decision box 76 that there is "no" time remaining, then branch 82 is taken. In the exemplary embodiment, the TTIMER statement has returned a value of zero. (If an STIMER statement to start the count down timer has not previously been executed, TTIMER initially returns a value of zero. The very first commit statement issued by the application program 10 or 44 and intercepted as represented in FIG. 3 results in branch 82 being taken, results in that first commit statement being passed on to the database management system 22 as described next below, and results in the count down timer in effect being initialized to the time interval based on the time interval parameter.)

Thus, execution proceeds to box 84, where the program commit statement is passed on to the database management system 22, as indicated by data flow arrow 86, which corresponds to a communication on line 60 of FIG. 2.

In box 88, the count down timer is again started (or started initially, if the particular commit statement is the first commit statement issued by the application program 10 or 44) with the time interval based on the time interval parameter, e.g. the TIME parameter, in units of 100ths of a second. The FIG. 3 routine then exits at 90.

FIG. 4 is a flowchart 100 representing a modification to the routine represented in FIG. 3. In the modification of FIG. 4, the COMMITFREQ parameter is employed, in addition to the TIME parameter. In FIG. 4, the COMMITFREQ parameter is used directly as the commit frequency divider value n. However, in other embodiments, a different mathematical relationship may be defined between the COMMITFREQ parameter accepted via the FIG. 2 parameter input 54 and the commit frequency divider value n; or between the FREQ input accepted as an Operator Modify Command via the FIG. 2 modify facility 56 and the commit frequency divider value n.

Figure 6:
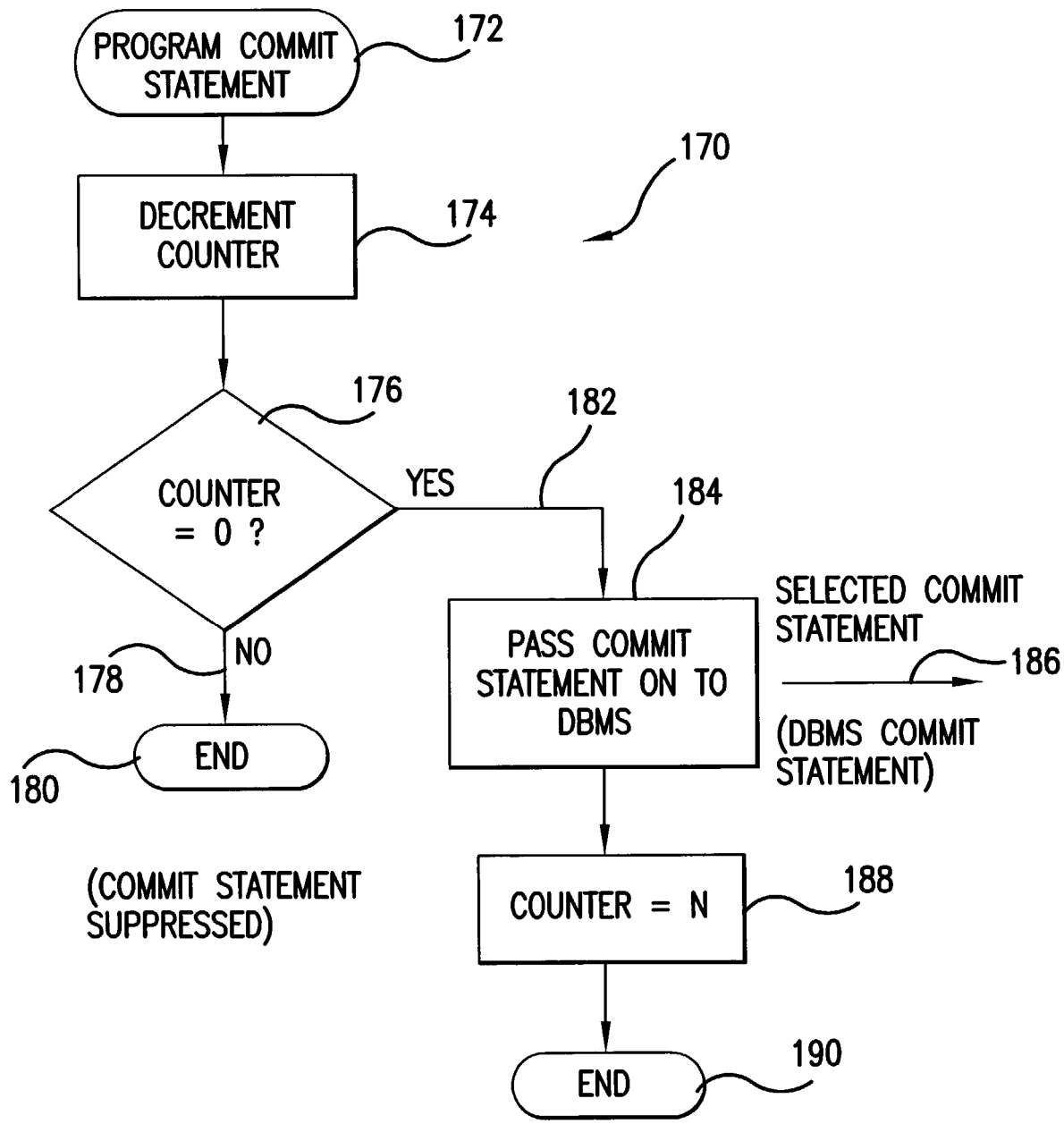
FIG. 6 is a program flow chart representing steps during the execution of an interface program included in the computer system of FIG. 2 in the alternative embodiment when an application program issues a commit statement.

In FIG. 4, an incrementing counter employing the variable COUNTER is employed to count commit statements issued by the application program 10 or 44. However, a decrementing counter could alternatively be employed, as is represented in the embodiment of FIG. 6, described hereinbelow. An optional initialization routine (not shown) is executed one time, at the beginning of execution of an application program, and initializes the variable COUNTER to zero. If the initialization routine (not shown) is not employed, the variable COUNTER is inherently initialized by the FIG. 4 routine itself once it has been called one or more times.

A PROGRAM COMMIT STATEMENT entry point is referenced 102. In Box 104 COUNTER is incremented. Decision box 106 determines whether COUNTER has reached the value of the frequency divider value n (which in this embodiment simply equals the value of the COMMITFREQ parameter).

If the answer in decision box 106 is "yes," then branch 108 is taken. In box 110, the program commit statement is passed on to the database management system 22, as indicated by data flow arrow 112, which corresponds to a communication on line 60 of FIG. 2. In box 114 the variable COUNTER is re-set to zero (or perhaps set to zero for the first time if no initialization routine was employed). The FIG. 4 routine then exits at 116.

If the answer in decision box 106 is "no," then branch 118 is taken. Following branch 118, the flowchart 100 of FIG. 4 is similar to the flowchart 70 of FIG. 3. Thus, in box 120 (which corresponds to FIG. 3 box 74) the count down timer is queried. In an exemplary embodiment, this query employs a TTIMER statement. In decision box 122 it is determined whether any time remains. If the answer is "yes," then branch 124 is taken and the routine exits at 124. The particular commit statement issued by the application program 10 or 44 is not passed on to the database management system 22. In other words, the particular program commit statement is suppressed.

If, on the other hand, it is determined in decision box 122 that there is "no" time remaining, then branch 128 is taken. In the exemplary embodiment, the TTIMER statement has returned a value of zero. Execution proceeds to box 130, where the program commit statement is passed on to the database management system 22, as indicated by data flow arrow 132, which corresponds to a communication on line 60 of FIG. 2. In box 134, the count down timer is again started with the time interval based on the time interval parameter, e.g. the TIME parameter, in units of 100ths of a second. In box 136 (which has no corresponding box in FIG. 3), the variable counter is re-set to zero. The routine exits at 138.

In the particular approach represented in FIG. 4 where both the TIME and the COMMITFREQ parameters are employed, the variable COUNTER employed in combination with the COMMITFREQ parameter is reset (boxes 114 and 136) every time a commit statement issued by the application program 10 or 44 is passed on to the database management system 22 (boxes 110 and 130). However, the timer employed in combination with the TIME parameter is reset (box 134) only when a commit statement issued by the application program is passed on to the database management system 22 (box 130) as a result of the time interval elapsing.

Figure 5:
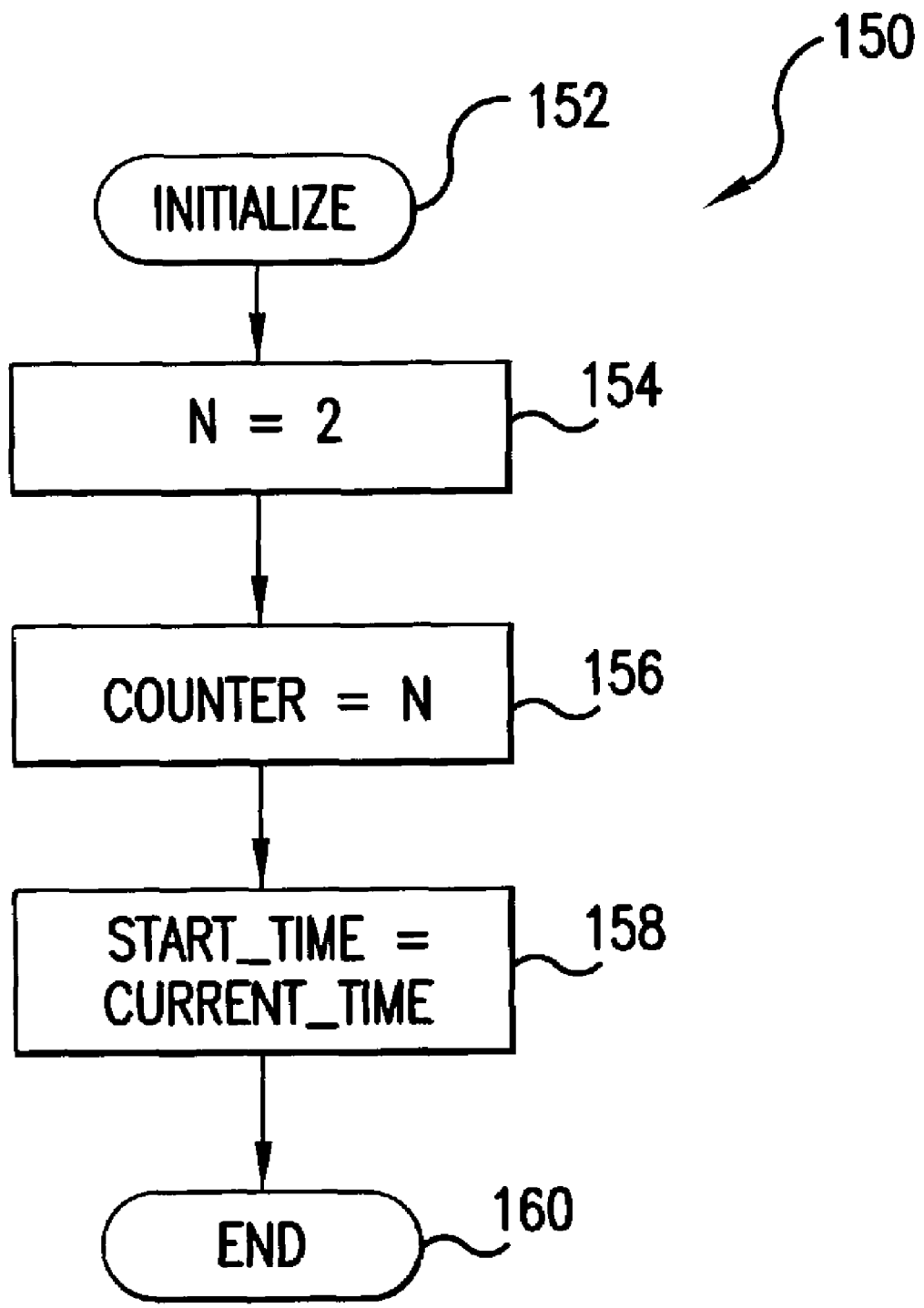
FIG. 5 is a flow chart representing steps during initialization of an alternative embodiment of the invention.
Figure 7:
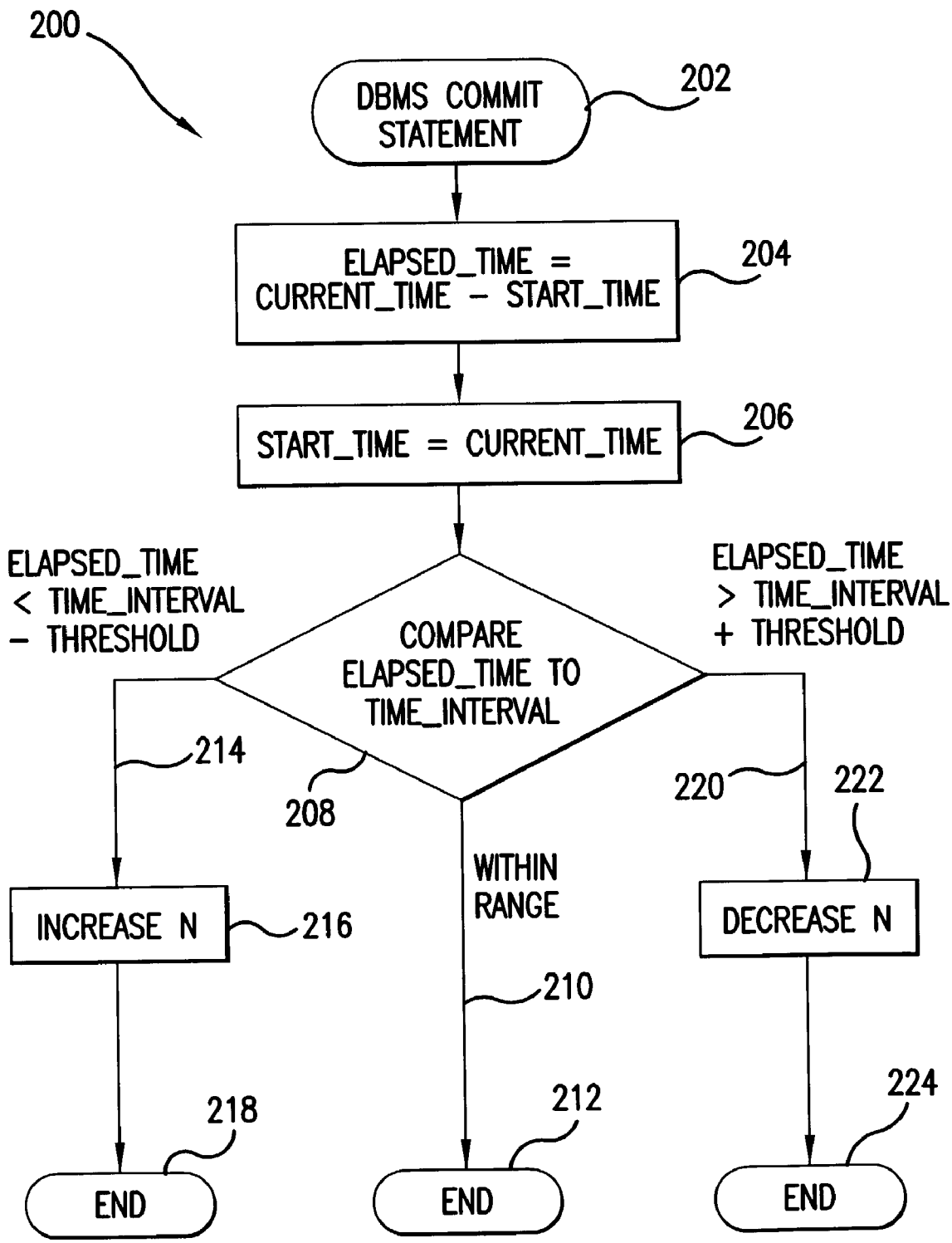
FIG. 7 is a program flow chart representing steps during the execution of an interface program included in the computer system of FIG. 2 in the alternative embodiment when a commit statement is passed on to the database management system.

In an alternative embodiment, described hereinbelow with reference to FIGS. 5, 6 and 7, the count down timer is not employed. Instead, what may referred to as a virtual COMMITFREQ parameter is determined, in particular a frequency divider value n is determined based on the time interval parameter TIME, so that commit operations are performed at approximate intervals as specified by the TIME parameter. When the TIME parameter is thus employed, the integer commit frequency divider value n is not the value of actual COMMITFREQ parameter. Thus in this alternative embodiment, only the TIME parameter is employed, not the COMMITFREQ parameter. FIGS. 5, 6 and 7 represent another embodiment of a selection component that suppresses commit statements issued by the application program 10 or 44 until a time interval based on a time interval parameter has elapsed, and passes the next commit statement issued by the application program 44 on to the database management system 22. FIGS. 5, 6 and 7, and in particular FIG. 7, represent a divisor-determining component that determines, based on a time interval parameter, a commit frequency divider value n by which the frequency at which commit statements are issued during program execution is divided to determine a reduced frequency at which commit operations are actually performed by the commit facility.

In the alternative embodiment, even with the same time interval parameter value, the commit frequency divider value n may end up being quite different between runs of the database application program as a batch process, depending upon how many other application processes are contending for resources in a multitasking environment. Moreover, when embodiments of the invention are employed, the commit frequency divider value n may vary dynamically during execution.

In the alternative embodiment, the commit frequency divider value n cannot be determined outside an actual execution environment. Thus, during execution, an initial value of n is iteratively refined until commit statements are passed on to the database management system 22 at actual intervals approximating a desired interval specified by the time interval parameter TIME. In an exemplary embodiment, the TIME parameter is any number between 1 and 99999, and specifies a time interval in hundredths of a second.

Moreover, the commit frequency divider value n is periodically refined during program execution so as to maintain a state in which commit statements are passed on to the database management system 22 at actual intervals approximating the desired intervals specified by the time interval parameter TIME.

More particularly, in an exemplary alternative embodiment the integer commit frequency divider value n is determined by arbitrarily setting an initial value, such as n=2, and then iteratively refining the initial value until commit statements are passed on to the database management system 22 at actual intervals approximating the desired intervals specified by the time interval parameter.

During program execution, an iterative process for refining an initial value of n comprises repeatedly determining the actual interval between successive commit statements passed on to the database management system 22, and comparing the actual interval to the desired interval. In the event the actual interval is shorter than the desired interval, the value of n is increased. In the event the actual interval is longer than the desired interval, the value of n is decreased. Any suitable algorithm may be employed for determining the amount by which n is increased or decreased.

Similarly, an iterative process for periodically refining the value of n during program execution comprises repeatedly determining the actual interval between successive commit statements passed on to the database management system 22, and comparing the actual interval to the desired interval. In the event the actual interval is shorter than the desired interval, the value of n is increased. In the event the actual interval is longer than the desired interval, the value of n is decreased. Any suitable algorithm may be employed for determining the amount by which n is increased or decreased.

In alternative embodiments, during program execution a process of passing on to the database management system 22 every nth commit statement issued by the application program 10 or 44 employs a counter. The counter is initialized, and is then employed to count commit statements issued by the application program. Based a count maintained by the counter, commit statements issued by the application program are suppressed until n commit statements have been counted. Then, the nth commit statement issued by the application program 10 or 44 is passed on to the database management system 22. After that, the counter is re-initialized to the current value of n.

The operations summarized just above may be implemented as described hereinbelow with reference to the representative flow charts of FIGS. 5, 6 and 7, which are exemplary only. The operations represented in the flow charts of FIGS. 5, 6 and 7 are part of the FIG. 2 interface program 52.

FIG. 5 is a flow chart 150 representing an initialization routine. The FIG. 5 routine is executed one time, at the beginning of execution of an application program 10 or 44. An INITIALIZE entry point is referenced 152. In box 154, an initial value of a variable N=2 is established for the commit frequency divider value n (which corresponds to the COMMITFREQ parameter that is not used when embodiments of the invention are invoked). In box 156, the value of COUNTER is initialized to the value of n. An alternative initialization statement would be COUNTER=2. In box 158, the value of a variable START_TIME is initialized to the value of the system time, represented as CURRENT_TIME, retrieved from the computer operating system in a conventional manner. Finally, the FIG. 3 initialization routine exits at 160.

FIG. 6 is a flow chart 170 for a routine executed each time an application program 10 or 44, such as the application program 44 (Application Program A) issues a commit statement. Although the routine represented by the flow chart 170 employs a decrementing counter to count commit statements issued by the application program, it will be appreciated that with a slight modification an incrementing counter may be employed, such as in the example of FIG. 4 above.

A PROGRAM COMMIT STATEMENT entry point is referenced 172. In box 174, the COUNTER variable is decremented. In decision box 176 it is determined whether the variable COUNTER has reached zero or not. If the answer is "no," then branch 178 is taken, and the routine exits at 180. The commit statement is not passed on to the database management system 22, since n commit statements have not yet been issued by the application program. In other words, the particular program commit statement is suppressed.

If, on the other hand, in decision box 176 it is determined that, "yes" the COUNTER variable has decremented to zero, then branch 182 is taken. Execution proceeds to box 184, where the program commit statement is passed on to the database management system 22, as indicated by dataflow arrow 186, which corresponds to a communication on line 60 of FIG. 2.

Then, in box 188, the COUNTER variable is re-initialized to the value of n, which is the frequency divider value. At this point, the value of n (variable N) may or may not still be equal to 2 as initialized in FIG. 5, depending upon whether n has been refined as described next with reference to FIG. 7. Finally, the FIG. 6 routine exits at 190.

FIG. 7 is a flow chart 200 representing a routine for refining the variable N, which corresponds to the commit frequency divider value n, either initially (starting from N=2) or at some subsequent time during program execution to refine the value of n. During execution, the FIG. 7 routine is called every time the FIG. 6 routine selects and passes a commit statement on to the database management system 22 in box 90. Thus, the FIG. 7 routine is called many times and iteratively refines the value of the variable N. Moreover, the value of the variable N is dynamically adjusted or refined during program execution as conditions change, in the execution environment for example. FIG. 7, accordingly represents a divisor-determining component that determines, based on a time interval parameter, a commit frequency divider value n by which the frequency at which commit statements are issued during program execution is divided to determine a reduced frequency at which commit operations are actually performed by the commit facility.

The FIG. 7 routine is entered at 202, labeled DBMS COMMIT STATEMENT. In box 204 the elapsed time since the previous commit operation passed on to the database management system 22 is determined. Thus, the variable ELAPSED_TIME is set equal to the system time (CURRENT_TIME) minus the START_TIME variable that was first initialized during execution of the FIG. 5 flow chart. In box 206, the START_TIME variable is reinitialized to the current system time, CURRENT_TIME.

Then, in decision box 208, the ELAPSED_TIME variable is compared to a desired TIME_INTERVAL, which corresponds to the TIME parameter. If the value of ELAPSED_TIME is sufficiently close to TIME_INTERVAL, then the decision is "within range" 120, and branch 210 is taken. The routine then exits at 212 with no adjustment to the value of the variable N.

If, however, commit operations are occurring more frequently than they should based on the value of the desired time interval parameter TIME, in decision box 208 it is determined that ELAPSED_TIME is less than TIME_INTERVAL minus a threshold, and branch 214 is taken. In box 216, the value of N is increased. The routine then exits at 218.

On the other hand, if commit operations are occurring less frequently than they should based on the value of the desired time interval parameter TIME, in decision box 208 it is determined that ELAPSED_TIME is greater than TIME_INTERVAL plus a threshold, and branch 220 is taken. In box 222, the value of the variable N is decreased. The routine then exits at 224.

Embodiments of the invention thus include methods as described above for reducing application program execution time by reducing the number of commit operations performed by the commit facility, based on a time interval parameter. Embodiments of the invention also include providing for the above-described methods to be implemented. Embodiments of the invention further include computer systems in which the above-described methods are implemented.

Figure 8:
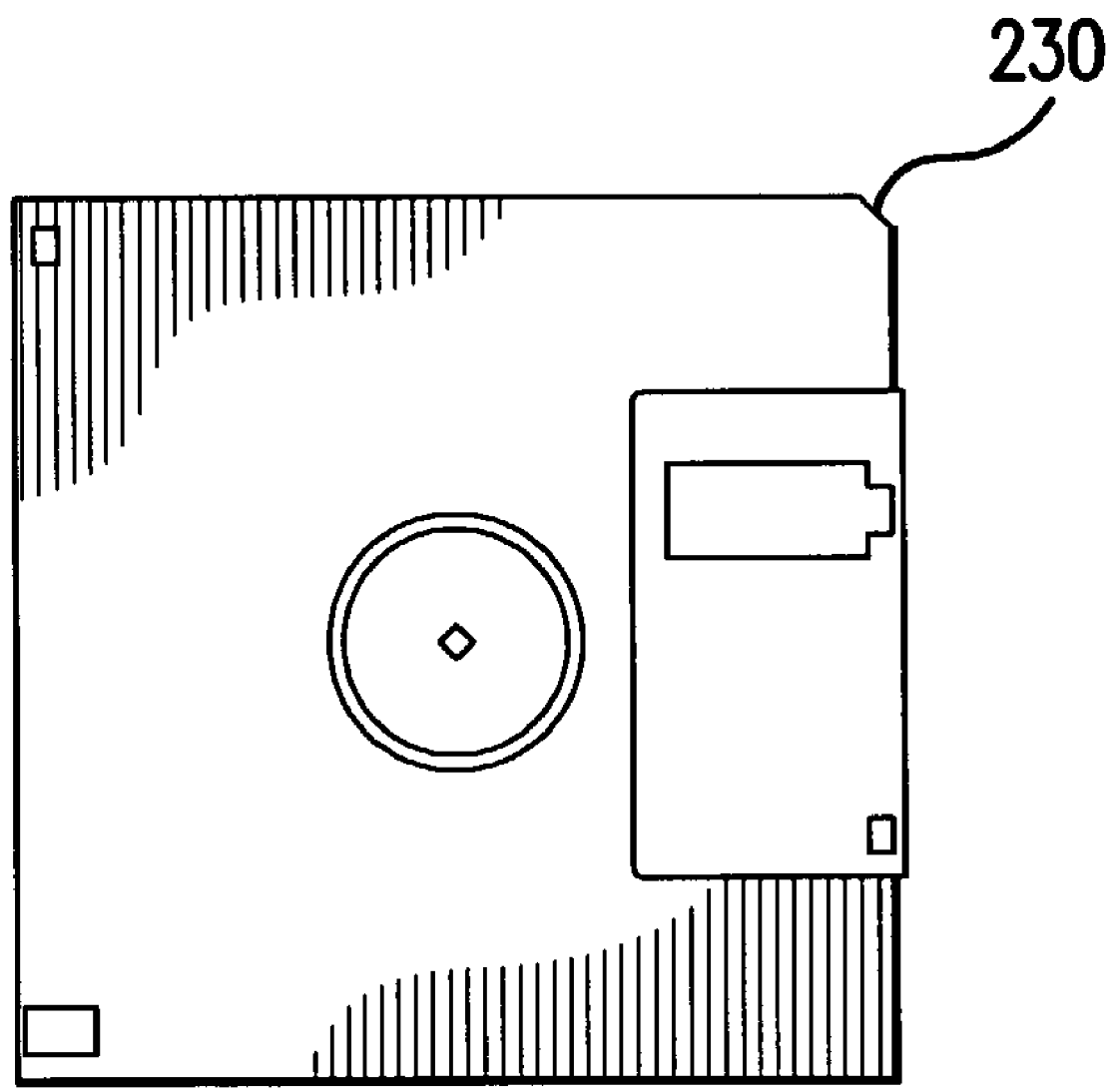
FIG. 8 represents a computer usable medium having computer readable program code means embodied thereon.

FIG. 8 depicts, as an article of manufacture, a medium 230 on which computer readable program code means to effect the above-described methods is recorded or embodied, in addition to computer readable program code means comprising the FIG. 2 interface program 22 itself. The medium 230 may comprise any suitable medium, such as a floppy disc, magnetic tape, CD-ROM or other suitable storage medium.

Embodiments of the invention may also be distributed by way of download from an internet web site, or by e-mail attachment.

While the novel features of the invention have been illustrated and described herein, it is realized that numerous modifications and changes will occur to those skilled in the art. It is therefore to be understood that the appended claims are intended to cover all such modifications and changes that fall within the true spirit and scope of the invention.

What is claimed is:

1. In an interface between a relational database application program and a database management system, the interface selectively passing statements issued by the relational database application program on to the database management system, the relational database application program including commit statements, and the database management system including a commit facility to effect a commit operation to commit pending database changes and release locks, a method of reducing application program execution time by reducing the number of commit operations performed by the commit facility, said method comprising:

based on a frequency parameter, establishing a commit frequency divider value, herein referred to as a variable n, by which the frequency at which commit statements are issued during program execution is divided to determine a reduced frequency at which commit operations are actually performed by the commit facility, as a minimum frequency; and repeatedly, intercepting and suppressing commit statements issued by the relational database application program until either a time interval based on a time interval parameter has elapsed, or the nth commit statement issued by the relational database application program since the last commit statement was passed on to the database management system has been issued by the relational database application program, whichever occurs first, and then correspondingly passing either the next commit statement issued by the relational database application program or that nth commit statement on to the database management system.

2. The method of claim 1, wherein said step of passing on to the database management system the nth commit statement issued by the relational database application program since the last commit statement was passed on to the database management system comprises:

initializing a counter;

employing the counter to count commit statements issued by the relational database application program;

passing on to the database management system the nth commit statement issued by the relational database application program; and re-initializing the counter whenever a commit statement is passed on to the database management system.

3. In an interface between a relational database application program and a database management system, the interface selectively passing statements issued by the relational database application program on to the database management system, the relational database application program including commit statements, and the database management system including a commit facility to effect a commit operation to commit pending database changes and release locks, a method of reducing relational database application program execution time by reducing the number of commit operations performed by the commit facility, said method comprising repeatedly suppressing commit statements issued by the relational database application program until a time interval based on a time interval parameter has elapsed, and passing the next commit statement issued by the relational database application program on to the database management system, by:

based on the time interval parameter, determining a commit frequency divider value, herein referred to as a variable n, by which the frequency at which commit statements are issued during program execution is divided to determine a reduced frequency at which commit operations are actually performed by the commit facility; and passing on to the database management system every nth commit statement issued by the relational database application program.

4. The method of claim 3, wherein said step of determining the commit frequency divider value n comprises iteratively refining an initial value of n during program execution until commit statements are passed on to the database management system at actual intervals approximating a desired interval specified by the time interval parameter.

5. The method of claim 3, wherein said step of passing on to the database management system every nth commit statement issued by the relational database application program comprises:

initializing a counter;

employing the counter to count commit statements issued by the relational database application program;

suppressing commit statements issued by the relational database application program until n commit statements have been counted, and then passing on to the database management system the nth commit statement issued by the relational database application program; and re-initializing the counter.

6. The method of claim 4, which further comprises periodically refining the commit frequency divider value n during program execution so as to maintain a state in which commit statements are passed on to the database management system at actual intervals approximating a desired interval specified by the time interval parameter.

7. The method of claim 4, wherein said step of iteratively refining an initial value of n during program execution comprises repeatedly:

determining the actual interval between successive commit statements passed on to the database management system, and comparing the actual interval to the desired interval; and in the event the actual interval is shorter than the desired interval, increasing the value of n, and, in the event the actual interval is longer than the desired interval, decreasing the value of n.

8. The method of claim 4, wherein said step of passing on to the database management system every nth commit statement issued by the relational database application program comprises:

initializing a counter;

employing the counter to count commit statements issued by the relational database application program;

suppressing commit statements issued by the relational database application program until n commit statements have been counted, and then passing on to the database management system the nth commit statement issued by the relational database application program; and re-initializing the counter.

9. The method of claim 6, wherein said step of periodically refining the value of n during program execution comprises repeatedly:

determining the actual interval between successive commit statements passed on to the database management system, and comparing the actual interval to the desired interval; and in the event the actual interval is shorter than the desired interval, increasing the value of n, and, in the event the actual interval is longer than the desired interval, decreasing the value of n.

10. For an interface between a relational database application program and a database management system, the interface selectively passing statements issued by the relational database application program on to the database management system, the relational database application program including commit statements, and the database management system including a commit facility to effect a commit operation to commit pending database changes and release locks, a method comprising providing for:

based on a frequency parameter, establishing a commit frequency divider value, herein referred to as a variable n, by which the frequency at which commit statements are issued during program execution is divided to determine a reduced frequency at which commit operations are actually performed by the commit facility, as a minimum frequency; and repeatedly, intercepting and suppressing commit statements issued by the relational database application program until either a time interval based on a time interval parameter has elapsed, or the nth commit statement issued by the relational database application program since the last commit statement was passed on to the database management system has been issued by the relational database application program, whichever occurs first, and then correspondingly passing either the next commit statement issued by the relational database application program or that nth commit statement on to the database management system.

11. The method of claim 10, wherein passing on to the database management system the nth commit statement issued by the relational database application program since the last commit statement was passed on to the database management system comprises providing for:

initializing a counter;

employing the counter to count commit statements issued by the relational database application program;

passing on to the database management system the nth commit statement issued by the relational database application program; and re-initializing the counter whenever a commit statement is passed on to the database management system.

12. For an interface between a relational database application program and a database management system, the interface selectively passing statements issued by the relational database application program on to the database management system, the relational database application program including commit statements, and the database management system including a commit facility to effect a commit operation to commit pending database changes and release locks, a method comprising providing for repeatedly suppressing commit statements issued by the relational database application program until a time interval based on a time interval parameter has elapsed by:

based on the time interval parameter, determining a commit frequency divider value, herein referred to as a the variable n, by which the frequency at which commit statements are issued during program execution is divided to determine a reduced frequency at which commit operations are actually performed by the commit facility; and passing on to the database management system every nth commit statement issued by the relational database application program.

13. The method of claim 12, wherein determining the commit frequency divider value n comprises providing for iteratively refining an initial value of n during program execution until commit statements are passed on to the database management system at actual intervals approximating a desired interval specified by the time interval parameter.

14. The method of claim 12, wherein passing on to the database management system every nth commit statement issued by the relational database application program comprises:

providing for initializing a counter;

providing for employing the counter to count commit statements issued by the relational database application program;

providing for suppressing commit statements issued by the relational database application program until n commit statements have been counted, and then passing on to the database management system the nth commit statement issued by the relational database application program; and providing for re-initializing the counter.

15. The method of claim 13, which further comprises providing for periodically refining the commit frequency divider value n during program execution so as to maintain a state in which commit statements are passed on to the database management system at actual intervals approximating a desired interval specified by the time interval parameter.

16. The method of claim 13, wherein providing for iteratively refining an initial value of n during program execution comprises providing for repeatedly:

determining the actual interval between successive commit statements passed on to the database management system, and comparing the actual interval to the desired interval; and in the event the actual interval is shorter than the desired interval, increasing the value of n, and, in the event the actual interval is longer than the desired interval, decreasing the value of n.

17. The method of claim 13, wherein passing on to the database management system every nth commit statement issued by the relational database application program comprises:
  providing for initializing a counter;
  providing for employing the counter to count commit statements issued by the relational database application program;
  providing for suppressing commit statements issued by the application program until n commit statements have been counted, and then passing on to the database management system the nth commit statement issued by the relational database application program; and
  re-initializing the counter.

18. The method of claim 15, wherein providing for periodically refining the value of n during program execution comprises providing for repeatedly:
  determining the actual interval between successive commit statements passed on to the database management system, and comparing the actual interval to the desired interval; and
  in the event the actual interval is shorter than the desired interval, increasing the value of n, and, in the event the actual interval is longer than the desired interval, decreasing the value of n.

19. A computer system for interfacing between a relational database application program that includes commit statements and a database management system that includes a commit facility to effect a commit operation to commit pending database changes and release locks, said computer system comprising
  memory for storing program instructions and data; and
  a selection component that
    based on a frequency parameter, establishes a commit frequency divider value, herein referred to as a variable n, by which the frequency at which commit statements are issued during program execution is divided to determine a reduced frequency at which commit operations are actually performed by the commit facility, as a minimum frequency; and
    repeatedly, intercepts and suppresses commit statements issued by the relational database application program either a time interval based on a time interval parameter has elapsed, or the nth commit statement issued by the relational database application program since the last commit statement was passed on to the database management system has been issued by the relational database application program, whichever occurs first, and then correspondingly passing either the next commit statement issued by the relational database application program or that nth commit statement on to the database management system.

20. The computer system of claim 19, wherein said selection component:
  initializes a counter
  employs the counter to count commit statements issued by the relational database application program;
  suppresses commit statements issued by the relational database application program until n commit statements have been counted, and then passes on to the database management system the nth commit statement issued by the relational database application program; and
  re-initializes the counter whenever a commit statement is passed on to the database management system.

21. A computer system for interfacing between a relational database application program that includes commit statements and a database management system that includes a commit facility to effect a commit operation to commit pending database changes and release locks, said computer system comprising memory for storing program instructions and data, and a selection component that suppresses commit statements issued by the relational database application program until a time interval based on a time interval parameter has elapsed, and passes the next commit statement issued by the relational database application program on to the database management system, wherein
  said selection component includes a divisor-determining component that determines, based on a time interval parameter, a commit frequency divider value, herein referred to as a variable n, by which the frequency at which commit statements are issued during program execution is divided to determine a reduced frequency at which commit operations are actually performed by the commit facility; and wherein
  said selection component passes on to the database management system every nth commit statement issued by the relational database application program.

22. The computer system of claim 21, wherein said divisor-determining component iteratively refines an initial value of n during program execution until commit statements are passed on to the database management system at actual intervals approximating a desired interval specified by the time interval parameter.

23. The computer system of claim 22, wherein said divisor-determining component periodically refines the commit frequency divider value n during program execution so as to maintain a state in which commit statements are passed on to the database management system at actual intervals approximating a desired interval specified by the time interval parameter.

24. The computer system of claim 22, wherein said divisor-determining component repeatedly:
  determines the actual interval between successive commit statements passed on to the database management system, and compares the actual interval to the desired interval; and
  in the event the actual interval is shorter than the desired interval, increases the value of n, and, in the event the actual interval is longer than the desired interval, decreases the value of n.

25. The computer system of claim 22, wherein said selection component:
  initializes a counter
  employs the counter to count commit statements issued by the relational database application program;
  suppresses commit statements issued by the relational database application program until n commit statements have been counted, and then passes on to the database management system the nth commit statement issued by the relational database application program; and
  re-initializes the counter.

26. The computer system of claim 22, wherein said selection component:
  initializes a counter
  employs the counter to count commit statements issued by the relational database application program;
  suppresses commit statements issued by the relational database application program until n commit statements have been counted, and then passes on to the database management system the nth commit statement issued by the relational database application program; and
  re-initializes the counter.

27. The computer system of claim 23, wherein said divisor-determining component repeatedly:
  determines the actual interval between successive commit statements passed on to the database management system, and compares the actual interval to the desired interval; and
  in the event the actual interval is shorter than the desired interval, increases the value of n, and, in the event the actual interval is longer than the desired interval, decreases the value of n.

28. An article of manufacture comprising a computer usable medium having computer readable program code means embodied thereon for providing an interface between a relational database application program that includes commit statements and a database management system that includes a commit facility to effect a commit operation to commit pending database changes and release locks, wherein said computer readable program code means in said article of manufacture:
  causes to be established, based on a frequency parameter, a commit frequency divider value, herein referred to as a variable n, by which the frequency at which commit statements are issued during program execution is divided to determine a reduced frequency at which commit operations are actually performed by the commit facility, as a minimum frequency; and
  repeatedly, causes commit statements issued by the relational database application program to be suppressed and then causes either the next commit statement issued by the relational database application program after a the time interval based on a time interval parameter has elapsed, or the nth commit statement issued by the relational database application program since the last commit statement was passed on to the database management system, whichever occurs first, to be passed on to the database management system.

29. The article of manufacture of claim 28, wherein said computer readable program code means that causes the nth commit statement issued by the relational database application program since the last commit statement was passed on to the database management system to be passed on to the database management system:
  causes a counter to be initialized;
  causes the counter to be employed to count commit statements issued by the relational database application program;
  causes commit statements issued by the relational database application program to be suppressed until n commit statements have been counted, and then causes the nth commit statement issued by the relational database application program passing on to the database management system; and
  then causes the counter to be-initialized.

30. An article of manufacture comprising
  a computer usable medium having computer readable program code means embodied thereon for providing an interface between a relational database application program that includes commit statements and a database management system that includes a commit facility to effect a commit operation to commit pending database changes and release locks, said computer readable program code means in said article of manufacture comprising means for repeatedly causing commit statements issued by the relational database application program to be suppressed until a time interval based on a time interval parameter has elapsed, and causing the next commit statement issued by the relational database application program to be passed on to the database management system by:
  causing to be determined, based on the time interval parameter, a commit frequency divider value, herein referred to as the a variable n, by which the frequency at which commit statements are issued during program execution is divided to determine a reduced frequency at which commit operations are actually performed by the commit facility; and
  causing every nth commit statement issued by the relational database application program to be passed on to the database management system.

31. The article of manufacture of claim 30, wherein said computer readable program code means causes the commit frequency divider value n to be determined by causing an initial value of n to be iteratively refined during program execution until commit statements are passed on to the database management system at actual intervals approximating a desired interval specified by the time interval parameter.

32. The article of manufacture of claim 30, wherein said computer readable program code means causes every nth commit statement issued by the relational database application program to be passed on to the database management system by:
  causing a counter to be initialized;
  causing the counter to be employed to count commit statements issued by the relational database application program;
  causing commit statements issued by the relational database application program to be suppressed until n commit statements have been counted, and then causes the nth commit statement issued by the relational database application program to be passed on to the database management system; and
  then causing the counter to be re-initialized.

33. The article of manufacture of claim 31, wherein said computer readable program code means causes the commit frequency divider value n to be determined by causing the value of n periodically to be iteratively refined during program execution so as to maintain a state in which commit statements are passed on to the database management system at actual intervals, approximating a desired interval specified by the time interval parameter.

34. The article of manufacture of claim 31, wherein said computer readable program code means causes an initial value of n to be iteratively refined during program execution by repeatedly:
  determining the actual interval between successive commit statements passed on to the database management system, and comparing the actual interval to the desired interval; and
  in the event the actual interval is shorter than the desired interval, increasing the value of n, and, in the event the actual interval is longer than the desired interval, decreasing the value of n.

35. The article of manufacture of claim 31, wherein said computer readable program code means causes every nth commit statement issued by the relational database application program to be passed on to the database management system by:
  causing a counter to be initialized;
  causing the counter to be employed to count commit statements issued by the relational database application program;
  causing commit statements issued by the relational database application program to be suppressed until n commit statements have been counted, and then causing the nth commit statement issued by the relational database application program to be passed on to the database management system; and then causing the counter to be re-initialized.

36. The article of manufacture of claim 33, wherein said computer readable program code means causes the value of n to be iteratively refined during program execution by repeatedly:

determining the actual interval between successive commit statements passed on to the database management system, and comparing the actual interval to the desired interval; and in the event the actual interval is shorter than the desired interval, increasing the value of n, and, in the event the actual interval is longer than the desired interval, decreasing the value of n.

* * * * *